Oct. 21, 1941.    C. STERN    2,259,710
COFFEE DISPENSER
Filed Aug. 18, 1939    3 Sheets-Sheet 1
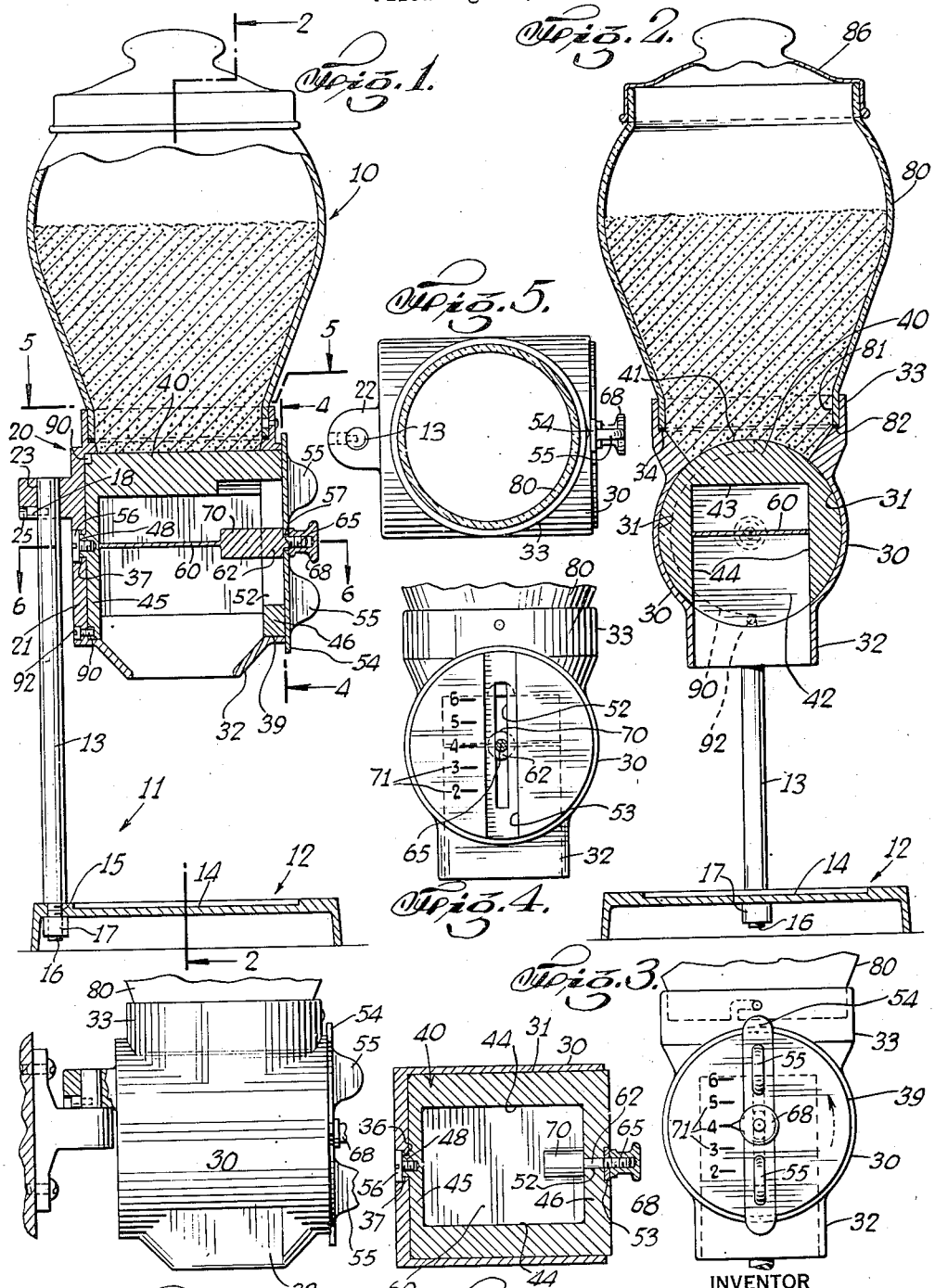
INVENTOR
CHARLES STERN
BY
J. B. Felshin
ATTORNEY Oct. 21, 1941.     C. STERN     2,259,710
COFFEE DISPENSER
Filed Aug. 18, 1939     3 Sheets-Sheet 2
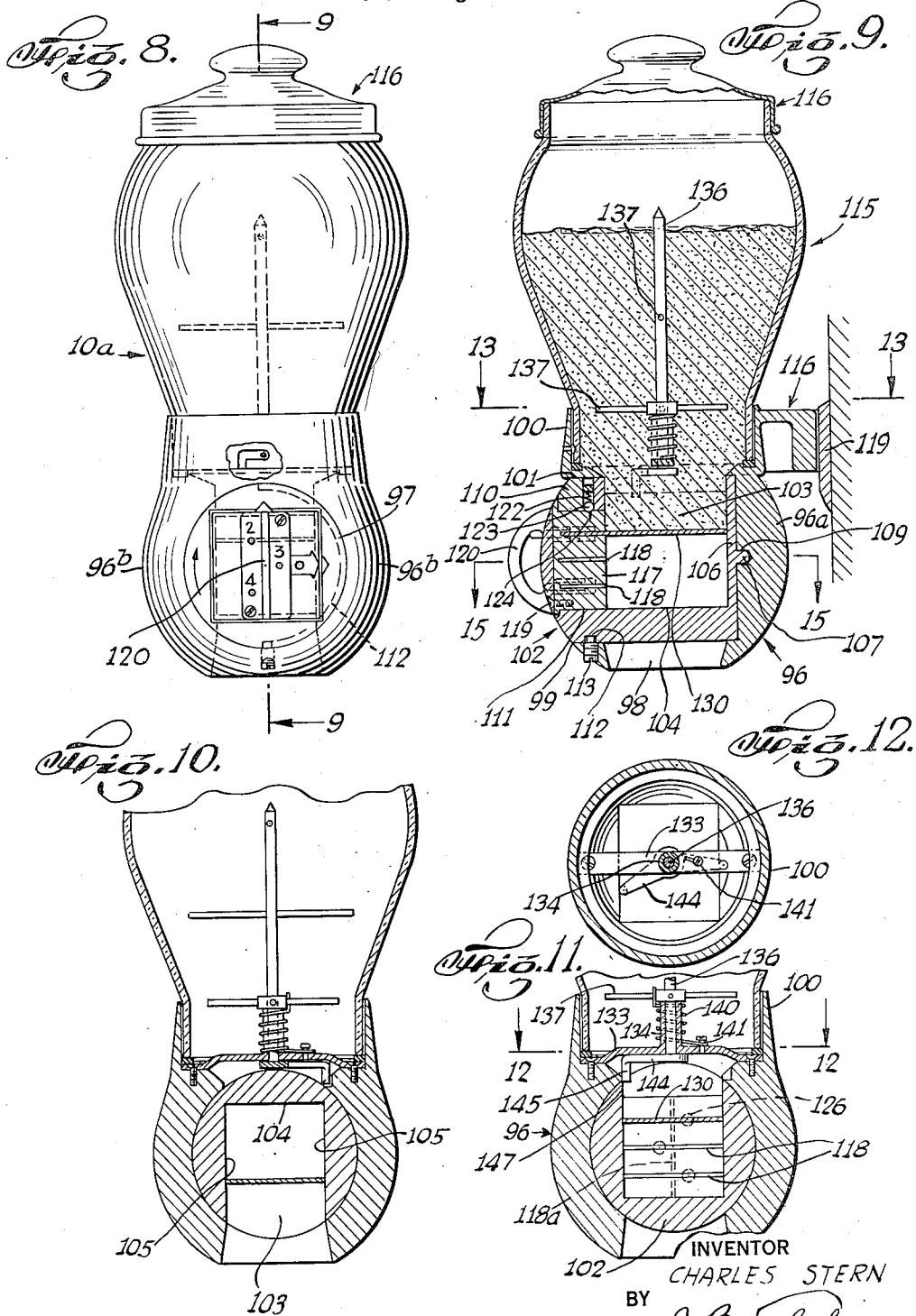
INVENTOR
CHARLES STERN
BY
J. B. Felshin
ATTORNEY Oct. 21, 1941.　　　　C. STERN　　　　2,259,710
COFFEE DISPENSER
Filed Aug. 18, 1939　　　　3 Sheets-Sheet 3
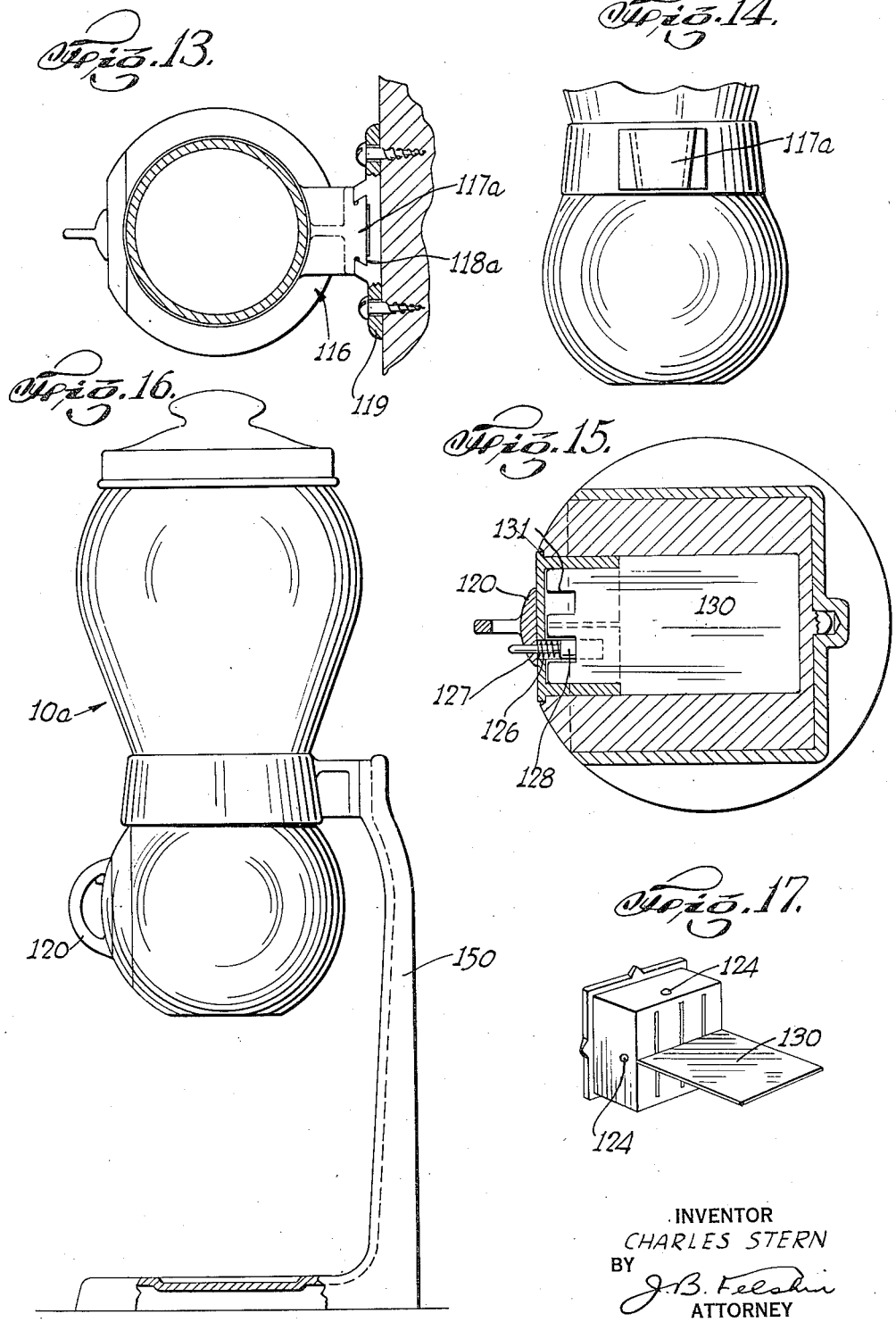
INVENTOR
CHARLES STERN
BY
　　J. B. Felshin
ATTORNEY Patented Oct. 21, 1941

2,259,710

UNITED STATES PATENT OFFICE 2,259,710

COFFEE DISPENSER

Charles Stern, Jersey City, N. J.

Application August 18, 1939, Serial No. 290,776

10 Claims. (Cl. 221—107)

This invention relates to dispensers for granular material. It is particularly directed to a device for dispensing measured quantities of coffee, sugar, tea or other powdered or granular material.

An object of this invention is to provide a measuring device of the character described, having improved means for regulating or varying the amounts of coffee or other material to be dispensed, means being further provided to indicate the amount dispensed.

A further object of this invention is to provide in an article of the character described, means for stirring the coffee or other material to be dispensed to prevent caking.

Yet another object of this invention is to provide a strong, rugged and durable article of the character described, which shall be relatively inexpensive to manufacture, easy to manipulate and adjust, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown various possible illustrative embodiments of this invention, Fig. 1 is a side elevational view of a coffee dispensing device embodying the invention mounted on a stand;

Fig. 2 is a cross-sectional view taken on line 2—2 of Fig. 1;

Fig. 3 is a front elevational view of a portion of the coffee dispenser;

Fig. 4 is a cross-sectional view taken on line 4—4 of Fig. 1;

Fig. 5 is a cross-sectional view taken on line 5—5 of Fig. 1;

Fig. 6 is a cross-sectional view taken on line 6—6 of Fig. 1;

Fig. 7 is an elevational view of a coffee dispensing device mounted on a wall bracket;

Fig. 8 is a front elevational view of a coffee dispensing device embodying the invention, and illustrating a modified construction;

Fig. 9 is a cross-sectional view taken on line 9—9 of Fig. 8;

Fig. 10 is an elevational, cross-sectional view of the dispenser device in coffee dispensing position;

Fig. 11 is an elevational, cross-sectional view similar to Fig. 10, but showing the dispenser in position to receive coffee from the coffee container;

Fig. 12 is a cross-sectional view taken on line 12—12 of Fig. 11;

Fig. 13 is a cross-sectional view taken on line 13—13 of Fig. 9;

Fig. 14 is a rear, elevational view of the coffee dispenser;

Fig. 15 is a cross-sectional view taken on line 15—15 of Fig. 9;

Fig. 16 is a side elevational view of the coffee dispenser on a stand; and

Fig. 17 is a perspective view of part of the adjusting mechanism.

Referring now in detail to the drawings, 10 designates a dispensing device embodying the invention mounted on a stand 11. Said stand comprises a base 12, to which there is attached an upstanding rod 13. The base 12 may be formed with a central annular recess 14 and with a through opening 15, adjacent its rear edge. The underside of the base may be hollow, as shown in Fig. 1. The rod 13 has a lower reduced screw threaded portion 16 projecting through the opening 15, and receives a nut 17 to fix the rod to the stand. Attached to the rod 13, somewhat below the upper end thereof, is a radial pin 18, for the purpose hereinafter appearing.

Mounted on the upper end of the rod, is the dispensing device 10. Said device comprises a housing member 20 having a rear wall 21, from which there projects a horizontal lug 22 formed with a vertical through opening 23 to receive the upper end of the rod 13. Said lug 22 is formed with a notch 25 to receive the pin 18 to retain the member 20 against rotation about the rod.

Extending from the rear wall 21 are side walls 30 having part-cylindrical inner surfaces 31. At the bottom of member 20 is an outlet nozzle or portion 32, and at the upper end of member 20 is a cylindrical upwardly extending flange 33 formed with an internal shoulder 34. The rear wall 21 has a bearing opening 36 co-axial with the part-cylindrical surfaces 31. The outer surface of rear wall 21 has a recess 37 concentric with the bearing opening 36. At the front of member 30 is a circular opening 39 of the same diameter as the part-cylindrical surfaces 31.

Rotatably mounted within member 20 is a box or member 40 adapted to be inserted into said member 20 through the front opening 39. The member 40 serves as a measuring device, and has a cylindrical outer surface 41, and is formed with a square chamber 42 having a bottom wall 43 and parallel side walls 44. Said member 40 has a rear wall 45 and a front wall 46. The rear wall 45 is formed with an axial portion 48 received within the bearing opening 36. A screw 50 screwed to the rear wall 45 has a head received within the recess 37 to retain the member 40 within the housing 20.

The front wall 46 of measuring member 40 is formed with a vertical slot 52. The front surface of front wall 46 is formed with a vertical groove 53. Slidably mounted within the groove 53 is a vertical plate 54 covering the slot 52. The plate 54 is formed with a pair of forwardly extending aligned projections 55, serving as handles for the purpose hereinafter appearing. Said plate 54 is formed with a central opening 57.

Within the chamber 42 is a flat plate 60 serving as an adjustable bottom wall for said chamber, said plate being disposed parallel to the surface 43 of said chamber. Said plate 60 is formed with a flat extension 62, slidably projecting through the slot 52. Extending from the portion 62 is a screw 65 passing through the opening 57. Screwed to the screw threaded extension 65 is a finger nut 68. The plate 60 may be formed with a strengthening rib 70, adjacent the projection 62.

It will now be understood that when the nut 68 is loosened, plate 54 together with plate 60, may be moved up and down to bring the latter plate closer or further away from the bottom 43 of the chamber 42. When the nut 68 is tightened, the plate 60 is fixed to the front wall 46 of member 40.

On the front surface of front wall 46 are markings 71 indicating the adjustment of the plate 60, for the purpose more clearly described hereinafter.

Mounted on the cylindrical flange 33, is a hopper or container 80 for coffee having a lower cylindrical flange 81 received within the flange 33 and supported on the shoulder 34. A rubber gasket 82 may be interposed between the lower end of the container 80 and said shoulder. The container 80 may be made of glass or any other suitable material, and is preferably opened at the top. A cover 86 may be provided for the upper end of the container 80.

It will now be understood that member 40 may be rotated by engaging the handles 55 and imparting a turning movement to the plate 54. When member 40 is in such position that the chamber 42 is open at the top, the coffee in glass container 80 will drop into the chamber and the amount of coffee received within the container will depend upon the position of the plate 60. When the plate 60 is nearer the top, less coffee will fall into the chamber, and when the plate 60 is brought near the bottom, a greater amount of coffee will drop into the chamber. Thus, the plate 60 may be adjusted in accordance with the markings 71 on the front wall of member 40 to permit sufficient coffee to drop into the chamber for brewing either two, three, four, five or six, or any other suitable number of cups of coffee.

Means is provided to limit rotation of the member 40 to 180 degrees, from the position shown in Fig. 2 of the drawings to a position in which the chamber 42 is open at the top. To this end, the rear surface of rear wall 45 is formed with a peripheral groove 90 extending through an angle of 180 degrees. Fixed to the rear wall 21 of member 20, is a pin 92 projecting into the groove 90. The pin 92 strikes the ends of the groove 90 to limit angular rotation of member 40.

In Figs. 8 to 15 there is illustrated a dispensing device 10a embodying a modified form of the invention. The dispensing device 10a comprises a housing member 96 having a rear wall 96a and side walls 96b, the latter being formed with part-cylindrical surfaces 97. Housing 96 has an outlet opening 98 at the bottom, and is formed with a cylindrical opening 99 at the front. Said housing 96 is furthermore formed with an upwardly extended cylindrical flange 100 at the top communicating with the cylindrical chamber 101 formed in said housing. Rotatively mounted within the chamber 101 is a cylindrical measuring member or box 102 having an outer cylindrical surface and formed with a recess or compartment 103 open at the top and having a bottom surface 104 and side surfaces 105. Member 102 has a rear wall 106 formed with a central axle 107 journalled in an opening 109 in the inner surface of rear wall 96a of housing 96.

Member 102 furthermore has a front wall 110 formed with a substantially square shaped opening 111 for the purpose hereinafter appearing. Said member 102 is furthermore formed with an external peripheral groove 112 having an extent of 180 degrees, and screwed to housing 96 is a pin 113 projecting into said groove to limit rotation of said member 102 from position shown in Figs. 8 and 9 of the drawings to a position shown in Fig. 10 of the drawings. It will now be understood that member 102 may be rotated from a position in which the box 103 opens to the top to receive coffee or the like material, to a position in which the box opens to the bottom so that any coffee or other material within the compartment will drop down through outlet 98.

Mounted on the housing member 96 is a container or hopper 115, the lower end whereof is received within the cylindrical flange 100. The top of the container 115 may be closed by a cover 116.

The housing 96 is formed with a lug 116 having a dovetail tongue 117a received in a groove 118a of a wall bracket 119a.

Means is provided to vary the amount of coffee dispensed, with dispenser 10a. To this end, there is slidably received within the opening 111 a block 117 formed on the inner surface thereof with a plurality of parallel slots 118, preferably equally spaced apart. Attached to the outside of the block, as by screws 119, is a handle member 120. It will now be understood that when the handle 120 is rotated the rotary member 102 will rotate therewith.

The front wall 110 is formed with a vertical through opening 122 in which is housed a spring pressed ball 123 received in a socket 124 in the upper surface of the block 117 to retain the block within the opening 111. Said block 117 is furthermore formed with a socket opening 126 aligned with each slot 118 and opening to the front. The handle member 120 covers the socket openings 126 and is formed with a reduced through opening 127 aligned with each socket opening. Within each socket opening 126 is a spring pressed pin 128 normally retained within the socket but adapted to be pressed forwardly through the opening 127 upon insertion of plate 130 in said slot.

The plate 130 serves as a bottom for the compartment 103. The position of the plate 130 can be determined by seeing which pin 128 projects forwardly at the front of the dispenser. It will now be understood that the plate 130 can be shifted to different slots 118 to increase or decrease the volume of the compartment 103, whereby varying amounts of coffee may be dispensed each time the member 102 is oscillated in opposite directions. The front edge of plate 130 may be formed with notches 131 partially receiving the pins 128.

The block 117 may be removed from opening 111 and then turned 90 degrees and again replaced in said opening. Said block may have an additional socket 124 on a surface at right angles to surface shown at the top in Fig. 9 to receive the spring pressed ball 123. The inner surface of the block 117 may be formed with a central slot 118a disposed at right angles to the slots 118 for receiving the plate 130. When the block is rotated through an angle of 90 degrees with the plate 130 inserted in the slot 118a, an amount of coffee will be dispensed equal to the entire volume of the compartment.

Means is provided to agitate the coffee or other material in hopper container 115 each time the rotary box 102 is oscillated back and forth. To this end, there is fixed to the housing 96 at the bottom of the cylindrical flange 100, a transverse bar 133 having a central upwardly extending tubular hub 134. Rotatably mounted within said hub 134 is a vertical axial rod 136 carrying a plurality of transverse agitating arms 137. Surrounding the hub 134 is a torsion spring 140 attached at one end to the bar 133, as at 141, and engaging at its other end one of the transverse arms 137 on the vertical rod 136.

Extending from the lower end of the rod 136, is a rod 144 having a downwardly extending foot 145 engaging the upper edge 147 at the open end of the box 102.

It will now be understood that each time member 102 is rotated in one direction, arm 144 will be rotated, thereby to agitate coffee in the hopper container and prevent caking.

When member 102 is oscillated back to its original position, torsion spring 140 will return the agitator likewise to its original position.

In Fig. 16 there is shown a dispensing device 10a, similar to device 10, but mounted on a stand 150 in any suitable manner.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. A device for dispensing granulated material comprising a member having an inlet at the top, and an outlet at the bottom, and being open at the front, a box insertable into said member through the open front thereof and being rotatably mounted therein, said box being open at one side, and having a chamber adapted to register with said inlet in one angular position of said box to receive granulated material passing through said inlet, and said box having a front wall closing the open front of said member, and being rotatable to a position in which said chamber registers with said outlet so that the material in said chamber will pour through said outlet, a plate in said box forming a bottom for said chamber, and means on said front wall to fix said plate in a plurality of adjusted positions.

2. A device for dispensing granulated material comprising a member having an inlet at the top, and an outlet at the bottom, and being open at the front, a box insertable into said member through the open front thereof and being rotatably mounted therein, said box being open at one side, and having a chamber adapted to register with said inlet in one angular position of said box to receive granulated material passing through said inlet, and said box having a front wall closing the open front of said member, and being rotatable to a position in which said chamber registers with said outlet so that the material in said chamber will pour through said outlet, a hopper on the inlet end of said housing, means in said box forming a bottom for said chamber, and means on said front wall to fix said bottom means in a plurality of adjusted positions to vary the volume of said chamber.

3. A device for dispensing granulated material comprising a member having an inlet and an outlet, a box rotatably mounted therein, said box being open at one side and having a chamber adapted to register with said inlet in one angular position of said box to receive granulated material passing through said inlet, and said box being rotatable to a position in which said chamber registers with said outlet so that the material in said chamber will pour through said outlet, and means to vary the volume of said chamber, whereby varying amounts of material may be dispensed, said member having a rear wall formed with a central bearing opening, said box having an axial portion journalled in said opening, and a screw screwed to said axial portion and having a head contacting said rear wall.

4. A device for dispensing granulated material comprising a member having an inlet and an outlet, a box rotatably mounted therein, said box being open at one side and having a chamber adapted to register with said inlet in one angular position of said box to receive granulated material passing through said inlet, and said box being rotatable to a position in which said chamber registers with said outlet so that the material in said chamber will pour through said outlet, and means to vary the volume of said chamber, whereby varying amounts of material may be dispensed, said box having means to close said inlet when said box is rotated from the position thereof in which the chamber registers with said inlet, said member being open at the front and having a rear wall formed with a central opening, said box having a rear wall provided with means journalled in said bearing opening, and a handle on said front wall of said box contacting the front end of said member.

5. A dispensing device comprising a housing open at the top and bottom, a box rotatably mounted therein and being open at the top, and having a part-cylindrical outer surface, means to adjust the volume of the box, and a hopper on the upper open end of the housing, said housing having a rear wall formed with a bearing opening, said box having an axial portion journalled in said bearing opening, and a screw screwed to said axial portion and having a head contacting said rear wall.

6. A dispensing device comprising a housing open at the top and bottom, a box rotatably mounted therein and being open at the top, and having a part-cylindrical outer surface, means to adjust the volume of the box, and a hopper on the upper open end of the housing, said housing having a cylindrical opening at the front, and said box being insertible into said housing through said cylindrical opening, said box having a front wall closing the front of said housing, a plate in said box forming the bottom of said box, said front wall having a vertical slot, and means on said plate passing through said slot to fix said plate to said front wall in various adjusted positions.

7. A dispensing device comprising a housing open at the top and bottom, a box rotatably mounted therein, said box having a front wall formed with a vertical slot, a plate within said box having a portion passing through said front wall, a screw pin extending from said portion, a member having a through opening to receive said screw pin, said member covering said slot and being slidably mounted on said front wall, and a nut on said pin to clamp said member to said front wall in various adjusted positions of said plate.

8. A device for dispensing granulated material comprising a member having an inlet and an outlet, a box rotatably mounted therein, said box being open at one side and having a chamber adapted to register with said inlet in one angular position of said box to receive granulated material passing through said inlet, and said box being rotatable to a position in which said chamber registers with said outlet so that the material in said chamber will pour through said outlet, said box having a plurality of slots, and a plate forming a bottom for said chamber, and having an edge thereof within one of said slots.

9. A device for dispensing granulated material comprising a member having an inlet and an outlet, a box rotatably mounted therein, said box being open at one side and having a chamber adapted to register with said inlet in one angular position of said box to receive granulated material passing through said inlet, and said box being rotatable to a position in which said chamber registers with said outlet so that the material in said chamber will pour through said outlet, said box having a plurality of slots, a plate forming a bottom for said chamber, and having an edge thereof within one of said slots, and means controlled by said plate to indicate in which of said slots the plate is received.

10. A device for dispensing granulated material comprising a member having an inlet at the top and an outlet at the bottom, and being open at the front, a box insertable into said member through the open front thereof and being rotatably mounted therein, said box being open at one side and having a chamber adapted to register with said inlet in one angular position of said box to receive granulated material passing through said inlet, and said box having a front wall closing the open front of said member, and being rotatable to a position in which said chamber registers with said outlet so that the material in said chamber will pour through said outlet, a plate in said box forming a bottom for said chamber, and means on said front wall to fix said plate in a plurality of adjusted positions, said means including a handle to rotate said box.

CHARLES STERN.